United States Patent [19]
Allen, Jr.

[11] Patent Number: 5,787,716
[45] Date of Patent: Aug. 4, 1998

[54] DRY ICE SUBLIMATION COOLING SYSTEM UTILIZING A VACUUM

[76] Inventor: Russel G. Allen, Jr., 4605 Tex Woods, San Antonio, Tex. 78249

[21] Appl. No.: 876,168

[22] Filed: Jun. 13, 1997

[51] Int. Cl.⁶ ............................................. F25D 13/06
[52] U.S. Cl. ................................ 62/63; 62/381; 62/388
[58] Field of Search ............................. 62/63, 374, 381, 62/388

[56] References Cited

U.S. PATENT DOCUMENTS 3,163,022  12/1964  Hottenroth .............................. 62/388
5,343,715   9/1994  Lang ....................................... 62/381

Primary Examiner—Ronald C. Capossela

[57] ABSTRACT

A method and apparatus for a dry ice sublimation system is shown. The dry ice is placed in a vacuum chamber and a vacuum is drawn on the vacuum chamber. As the dry ice sublimates, the cold sublimated gas is fed into a cooling chamber which contains products to be cooled. The temperature of the cooling chamber may be varied inversely with the vacuum in the vacuum chamber, which inversely varies the sublimation temperature of the dry ice and hence the temperature of the sublimated gas. Automatic feed systems may continuously supply product to be cooled or dry ice or both. A bypass around the vacuum chamber allows a turbulence to be created around the dry ice in the vacuum chamber to aid the rate of sublimation.

18 Claims, 4 Drawing Sheets

5,787,716

1

DRY ICE SUBLIMATION COOLING SYSTEM UTILIZING A VACUUM

BACKGROUND OF THE INVENTION

1. Field of the Invention

The invention relates to a method and apparatus for a dry ice sublimation cooling system utilizing a vacuum to cool products.

2. Summary of the Prior Art

Many different types of cooling systems have been developed, especially to quick freeze products such as food. While the type of cooling systems vary greatly, one type of cooling system that has developed involves the use of dry ice. In fact, the inventor of this application was a co-inventor on U.S. Pat. No. 5,222,363 entitled "Fluidized Bed Air Cooling System" that utilizes dry ice, which patent is incorporated herein by reference. In the incorporated reference, it can be seen that a stream of air continuously causes the pellets of dry ice to rotate as they sublimate.

There are companies that make various types of carbon dioxide cooling systems, the substance that is used to make dry ice. A company named Liquid Carbonic Corporation has machines that spray liquid $CO_2$ on the products to be frozen. Such equipment is made and sold throughout the United States.

Tomco Systems also has a dry ice cooling system as was mentioned in the cited references of the incorporated patent. Recently The BOC Group, Inc., also known as "Airco," came out with equipment under the mark KWIKFREEZE that utilizes a fluidized bed of product in combination with liquid nitrogen as the cooling medium.

Prior art cooling systems that use $CO_2$ (dry ice) are no where near as effective as the present invention because the cooling temperature of the prior art $CO_2$ cooling chambers is much higher than the cooling temperature as contained in the present invention. By lowering the pressure around the dry ice that is being sublimated for its cooling effect, the temperature at which sublimation occurs also is lowered. In this manner, the stream of sublimated $CO_2$ that is being drawn from the vacuum chamber of the present invention is a much lower temperature gaseous stream than can be created by the prior art devices. As an example, some of the prior art devices would have a typical cooling temperature of minus 110 degrees Fahrenheit ($-110°$ F.) whereas the present invention would typically operate with cooling temperatures between minus 130 and minus 150 degrees fahrenheit ($-130°$ F. to $-150°$ F.).

SUMMARY OF THE INVENTION

It is the object of the present invention to provide a dry ice sublimation cooling system utilizing a vacuum around dry ice.

It is another object of the present invention to have the dry ice in a chamber where a vacuum is drawn to lower the pressure at which the dry ice is sublimated and in turn lower the temperature at which the dry is sublimated.

It is yet another object of the present invention to provide a system where a product is cooled by a stream of cool gas from sublimated dry ice.

It is still another object of the present invention to provide a continuous feed dry ice sublimation system utilizing a vacuum around the dry ice which lowers the temperature of sublimation, the stream of cool gas from the sublimated dry ice flowing into a cooling chamber through which the product to be cooled is fed.

It is yet another object of the present invention to provide a control system for controlling the temperature in a cooling chamber in which product is to be cooled by varying the pressure in a vacuum chamber in which dry ice is located, sublimated gas from the dry ice being fed into the cooling chamber.

It is another object of the present invention to have a batch feed system where a batch of dry ice is placed into a vacuum chamber in which a vacuum is then drawn, and as the dry ice sublimates, the stream of gaseous $CO_2$ from sublimation of the dry ice is fed into a cooling chamber through which product is fed and rapidly cooled until the batch of dry ice is completely sublimated.

Dry ice is located in a vacuum chamber. The vacuum chamber may have a continuous feed of dry ice into the vacuum chamber or it may be a batch feed system where dry ice is simply placed into the cooling chamber and the system runs until the dry ice is completely sublimated.

A propeller with a labyrinth seal therearound may be used to draw a vacuum on the vacuum chamber. As a vacuum is being drawn on the vacuum chamber, the dry ice sublimates with the sublimated gas being at lower and lower temperatures as the vacuum is increased. The gaseous $CO_2$ that has formed from the sublimated dry ice is drawn by the propeller into a cooling chamber. The cooling chamber has a continuous feed conveyor system so that product continuously feeds into the cooling chamber and is rapidly cooled by the gaseous stream from the sublimated dry ice. A control system is provided that can measure the vacuum in the vacuum chamber or the temperature in the cooling chamber and, through a variable speed motor, controls either the vacuum or the temperature which in turn controls the other.

A bypass system is provided around the vacuum chamber so as to create a turbulence around the dry ice inside the vacuum chamber. A good turbulence aids in the rate of sublimation of the dry ice.

To prevent the extremely low temperatures from destroying the variable speed motor that turns the propeller, an insulating coupling is provided to prevent heat transfer up the shaft into the variable speed motor. Otherwise, because of the extremes in the temperature, the bearings inside the variable speed motor would be destroyed.

DESCRIPTION OF THE PREFERRED EMBODIMENT

Figure 1:
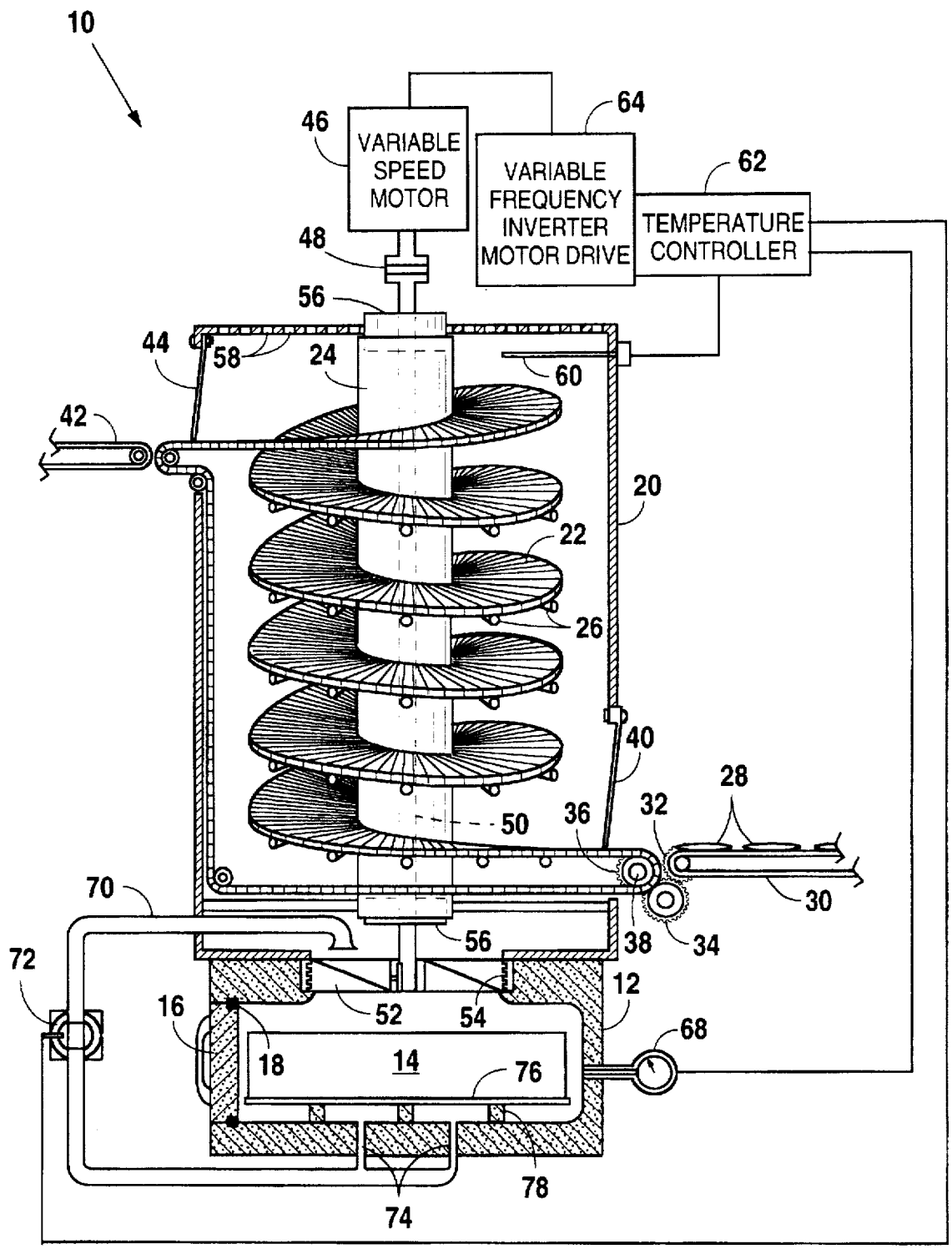
FIG. 1 is an elevated partial sectional view of a dry ice sublimation cooling system utilizing a vacuum.
Figure 3:
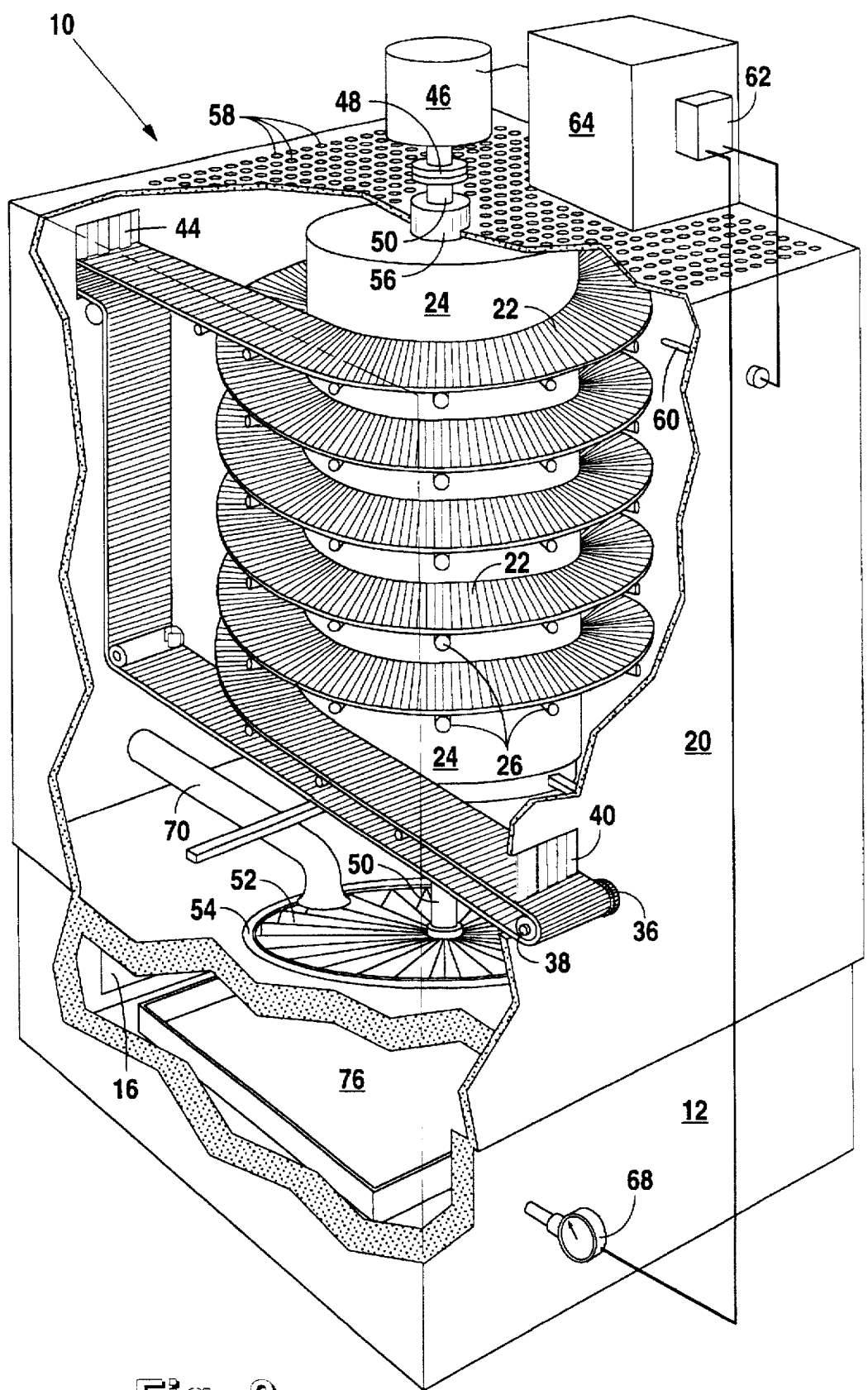
FIG. 3 is a partial cut-away perspective view of the invention shown in FIG. 1.

In the present invention, a dry ice sublimation cooling system is shown that utilizes a vacuum in a chamber where dry ice is being sublimated. As the vacuum is increased, the temperature at which the dry ice sublimates is lowered. Referring to FIGS. 1 and 3 in combination, there is shown a dry ice sublimation cooling system represented generally by the referenced numeral 10. The lower part of the dry ice sublimation cooling system 10 consists of a vacuum chamber 12 in which is placed dry ice 14, block or pellet form, through air tight door 16. Because the temperature inside the vacuum chamber 12 could reach temperatures as low as minus 200 degrees Fahrenheit, the walls of the vacuum chamber 12 should be well insulated. The air tight door 16 is sealed by means of seals 18.

Above the vacuum chamber 12 is located a cooling chamber 20 in which product to be cooled is conveyed. The cooling chamber 20 has a circular conveyor belt 22 that turns in a circular fashion around center post 24. The circular conveyor belt 22 may be any of a number of common types with a typical type being shown in U.S. Pat. No. 4,078,655 issued to Roinestad entitled "Small Radius Conveyor Belt and Conveying System." The circular conveying belt 24 is supported by support rods 26 extending out from the center post 24. The center post 24 is free to rotate inside of the cooling chamber 20. The product to be cooled 28 is delivered to the circular conveyor belt 22 inside of the cooling chamber 20 by means of an inlet conveyor belt 30 that connects to another source not shown.

On the end of the inlet conveyor belt 30 is a drive gear 32 that connects through a reversing gear 34 to connect to a circular conveyor drive gear 36. The circular conveyor drive gear 36 turns the shaft 38, which in turn turns the circular conveyor belt 22.

The providing of drive for the circular conveyor belt 22 through drive gear 32, reversing gear 34 and circular convey drive gear 36, is for illustration purposes only. The center post 24 could be independently driven to provide drive for the conveyor belt 22. Also gears would be connected to outlet conveyor belt 42 to provide drive for circular conveyor belt 22.

The inlet convey belt 30 feeds the product to be cooled 28 through an opening protected by flaps 40 to maintain as much cool sublimated gas as possible inside the cooling chamber 20. As the product to be cooled 28 is delivered to the circular conveyor belt 22, the product travels upward until it is discharged onto outlet conveyor belt 42 through the outlet opening protected by flaps 44. Again, flaps 44 help maintain the cool sublimated gas inside of the cooling chamber 20.

Slack will occur in the circular conveyor belt 22 due to temperature changes in the cooling chamber 20. A mechanism to take up slack, while not shown herein, also should be included.

Above the cooling chamber 20 is located a variable speed motor 46 that connects through a temperature insulated coupling 48 to a shaft 50. Shaft 50 extends down to propeller 52 that connects on its outer edge through a labyrinth seal 54 to vacuum chamber 12. Below the insulated coupling 48 on the shaft 50 is a shaft support and seal mechanism 56 that has a teflon lower bearing (not shown) and a seal that rotates with shaft 50 and is made as one integrated component. If necessary, small bleed holes 58 may be contained in the top of the cooling chamber 20.

A thermocouple 60 located inside of the cooling chamber 20 feeds an electrical signal to a temperature controller 62. Temperature controller 62 is actually a special purpose computer that is designed to operate the dry ice sublimation cooling system utilizing the vacuum as shown in the present invention. Special programming is needed for the temperature controller 62 based on the particular parameters desired in the system. However, in general, the thermocouple 60 will measure the temperature inside of the cooling chamber 20.

Figure 4:
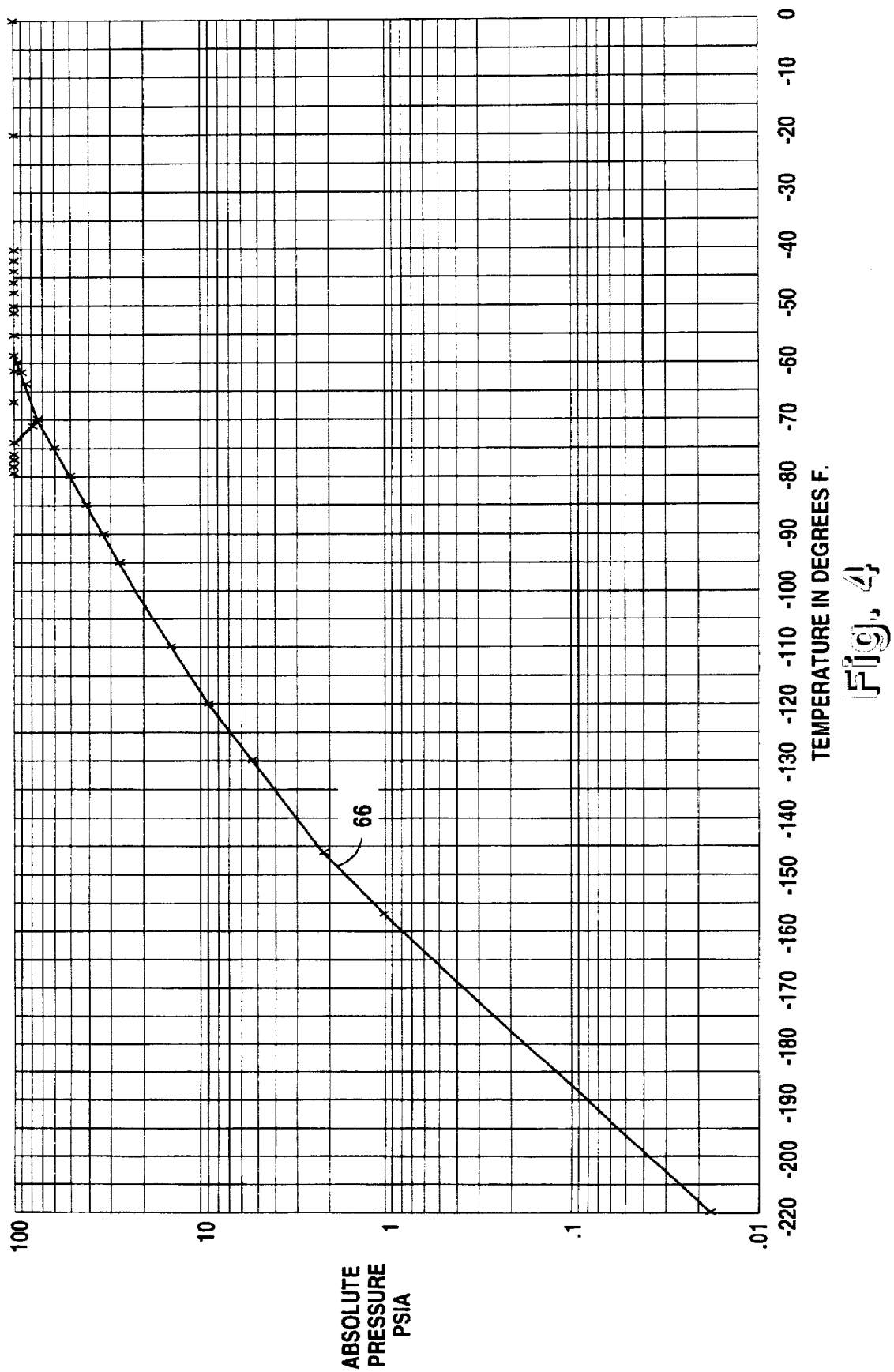
FIG. 4 is a chart of the sublimation temperature of dry ice versus absolute pressure.

Assuming the cooling chamber 20 is designed to operate at minus 150 degrees Fahrenheit, initially the thermocouple will be measuring the vacuum chamber temperature and will cause the temperature controller 62 to turn ON. The temperature controller 62, through a variable frequency invertor motor drive 64, will turn the variable speed motor 46 up to full speed. The motor 46 turns the shaft 50 which in turn will turn the propellers 52. The turning of the propellers 52 at full speed will draw the maximum amount of vacuum that is possible on vacuum chamber 12. As the vacuum is drawn on vacuum chamber 12, the sublimation point of the dry ice 14 continues to decrease as the pressure decreases. A graphic representation of the decrease of sublimation temperature of dry ice versus absolute pressure is shown in FIG. 4. The line 66 represents the absolute pressure at which the dry ice 14 will sublimate. For example, minus 150 degrees Fahrenheit (−150° F.) corresponds to about 1.98 pounds of pressure per square inch absolute (PSIA).

As the temperature inside of cooling chamber 20 approaches minus 150 degrees fahrenheit, the temperature controller 62 will change the frequency of the variable frequency invertor motor drive 64, which in turn will decrease the speed of the variable speed motor 46.

Inversely proportional to the temperature inside the cooling chamber 20 is the vacuum inside the vacuum chamber 12. Therefore, the temperature controller 62 could be controlled by vacuum gauge 68 which can also feed to the temperature controller 62. On the other hand, the vacuum gauge 68 could simply be a redundant check to the signal being received from the thermocouple 60. While the relationship between the vacuum is measured by the vacuum gauge 68 and the temperature is measured by the thermocouple 60 are inversely related, it is not a linear relationship. The exact relationship between the two would have to be determined for a particular system based on trial and error and such relationship then entered into memory of the computer contained within the temperature controller 62.

Enc users tend to set the speed of variable speed motors at their maximum speed to supposedly get the lowest temperature possible in the cooling chamber 20. However, experience has shown that maximum speed for variable speed motor 46 is not necessarily the most efficient method of operation. For example, at maximum speed, a lot of cooling may be lost by sublimated $CO_2$ being discharged out of cooling chamber 20 before it has absorbed a significant amount of heat from the product to be cooled 28. The ideal speed of variable speed motor 46 will have to be determined by experimentation for each system and possibly each product.

Connecting from the cooling chamber 20 above the discharge from the propellers 52 is a bypass line 70 that connects back to the lower side of the vacuum chamber 12 through a control valve 72. The purpose of the bypass line 70 is to create a turbulence inside the vacuum chamber 12. A turbulence inside the vacuum chamber 12 aids in the sublimation of the dry ice 14. While the control valve 72 can be independently operated and controlled, the amount of sublimated $CO_2$ that is bypassed is regulated by the control valve 72 and can be set by the temperature controller 62. While the illustration only shows two openings 74 feeding from the bypass line 70 to the bottom of the vacuum chamber 12, a number of openings would be provided for good turbulence. The dry ice 14 is supported on a platform 76 maintained off the bottom of the vacuum chamber 12 by means of posts 78.

METHOD OF OPERATION

A batch of dry ice 14 is placed inside the vacuum chamber 12 through the air tight door 16. Before the conveyors 22, 30, and 42 are turned on, the rest of the system is turned through temperature controller 62. Temperature controller 62 through variable frequency invertor motor drive 64 turns the variable speed motor 46 to full speed. The turning of the shaft 50 and the propeller 52 draws a vacuum inside of the vacuum chamber 12. A certain portion of the sublimated gas is fed back through bypass line 70 to create a turbulence inside of the vacuum chamber 12 which aids the rate of sublimation of the dry ice.

As the temperature inside of the cooling chamber 20 reaches the desired temperature with minus 150 degrees Fahrenheit (−150° F.) being typical, the speed of the variable speed motor 46 is decreased and the conveyors 22, 30, and 42 are turned. As the product to be cooled 28 is fed into the cooling chamber 20, because of the low temperature, the product to be cooled 28 is quickly frozen in a quick-freeze process, much faster than other commercial quick-freeze systems. The product to be cooled 28 feeds up through the cooling chamber 20 and out the outlet conveyor belt 42. To insure a uniform flow of sublimated $CO_2$ gas, bleed holes 58 are located in the top of the cooling chamber 20. The vacuum gauge 68 feeds a signal to the temperature controller 62 that should be inversely proportional to the temperature being measured by thermocouple 60. The amount of turbulence is also controlled either manually or by the temperature controller 62 by adjusting the control valve 72.

The dry ice sublimation system 10 as shown in FIGS. 1 and 3 will continue to operate until the batch of dry ice 14 is sublimated. While the exact temperature ranges of the cooling chamber 20 may vary, it is believed that the typical temperature ranges would be between minus 100 degrees fahrenheit and minus 200 degrees Fahrenheit (−100° F. to −200° F.). While sublimation temperatures below minus 200 degrees Fahrenheit (−200° F.) may be possible, it will be difficult to reach that vacuum pressure. In an ordinary dry ice sublimation system using a vacuum, temperatures in the cooling chamber of minus 150 degrees Fahrenheit (−150° F.) are normal. This is much colder than the current dry ice sublimation systems that typically operate at approximately minus 110 degrees Fahrenheit (−110° F.).

ALTERNATIVE EMBODIMENT

Figure 2:
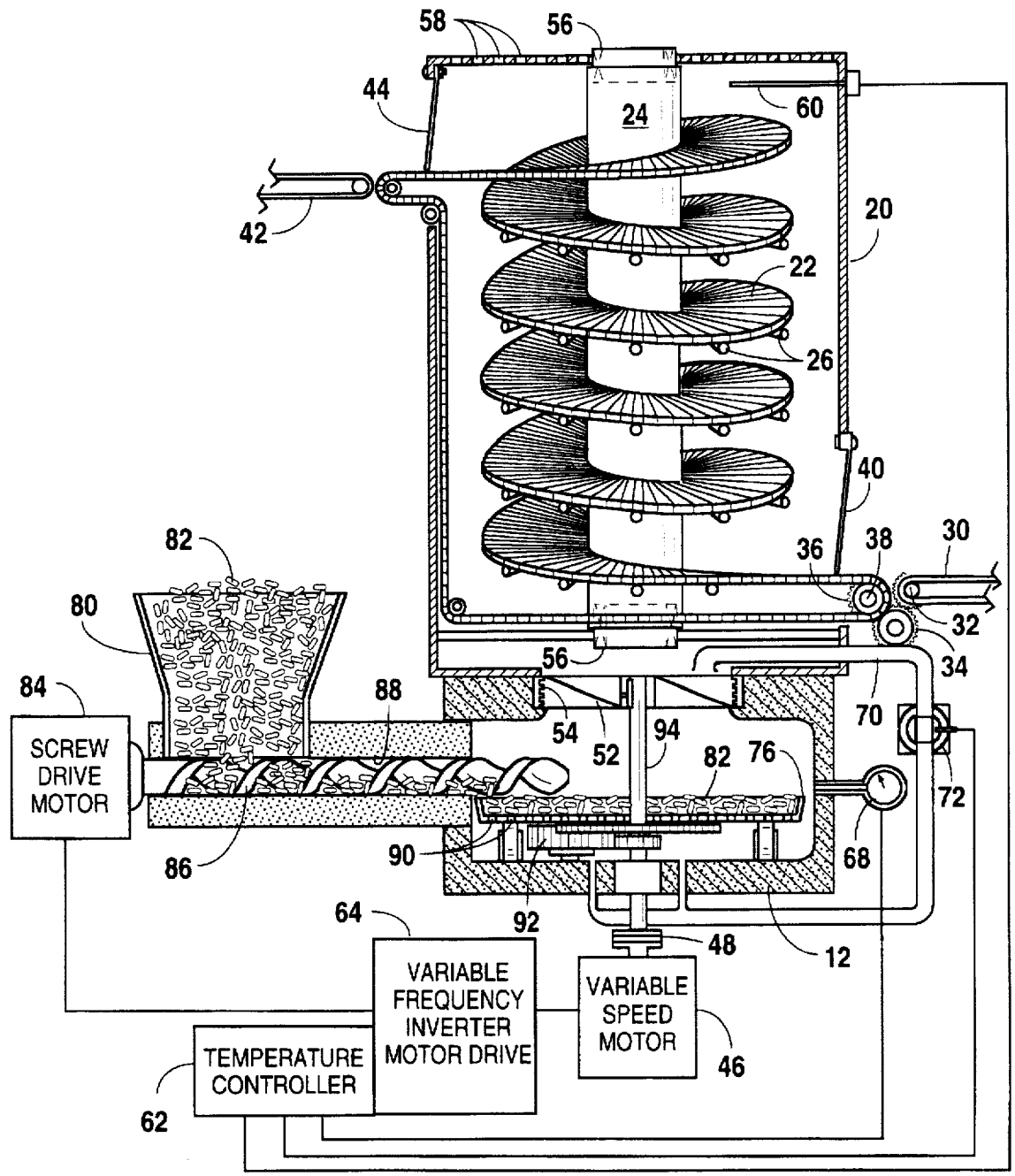
FIG. 2 is an alternative embodiment of an elevated partial sectional view of a dry ice sublimation cooling system utilizing a vacuum.

Rather than a batch feed system as is shown in FIGS. 1 and 3, a continuous feed dry ice system is shown in FIG. 2. All numbers are the same except for the numerals indicated hereinbelow. A hopper 80 is filled with pelletized dry ice 82. A screw drive motor 84 slowly turns a screw conveyor 86 that delivers pelletized dry ice 82 into the vacuum chamber 12. The operation of the screw drive motor 84 is very slow and turns the screw conveyor 86 very slowly. The outer edges of the screw conveyor 86 are in a tight fitting relationship with screw conveyor passage 88 to maintain as good a vacuum inside vacuum chamber 12 as possible.

The tray 90 on which the pelletized dry ice 82 is deposited is porous to allow the air to flow upward therethrough. The tray 90 is further rotated either by means of an independent rotation system or through a series of reduction gears 92 that feed off the drive shaft 94 that turns the propellers 52.

With the modification as shown in this alternative embodiment, the dry ice sublimation cooling systems shown in FIG. 2 is a continuous feed system both for the product to be cooled and for the dry ice used in performing the cooling.

I claim:

1. A method for cooling articles using dry ice comprising the following steps:

locating said articles to be cooled in a cooling chamber;

placing dry ice in a vacuum chamber;

creating a vacuum in said vacuum chamber;

removing gas from said vacuum chamber as said dry ice sublimates to said cooling chamber to cool said articles;

controlling temperature in said cooling chamber by adjusting said vacuum in said vacuum chamber which in turn regulates pressure around said dry ice in said vacuum chamber, lower pressure in said vacuum chamber lowers temperature of said removed gas and lowers temperature in said cooling chamber, higher pressure in said vacuum chamber raises temperature of said removed gas and raises temperature in said cooling chamber.

2. The method of cooling articles as recited in claim 1 including a further step of by-passing some of said removed gas back to said vacuum chamber to create a turbulence around said dry ice, said dry ice being positioned in said vacuum chamber to allow said turbulence therearound.

3. The method of cooling articles as recited in claim 2 wherein said controlling step varies said by-passing step to adjust said removed gas by-passed back to said vacuum chamber.

4. The method of cooling articles as recited in claim 1 wherein said creating step includes the following:

positioning a variable speed motor to draw said vacuum in said vacuum chamber;

measuring temperature of said removed gas;

varying speed of said variable speed motor in response to said measured temperature of said removed gas which varies pressure in said vacuum chamber.

5. The method of cooling articles as recited in claim 1 wherein said creating step includes the following:

positioning a variable speed motor to draw said vacuum in said vacuum chamber;

measuring said vacuum in said vacuum chamber;

varying speed of said variable speed motor in response to said measured vacuum which regulates temperature of said removed gas in said cooling chamber.

6. The method of cooling articles as recited in claims 4 or 5 wherein said variable speed motor is insulated by a thermal barrier device from impellers turned by said variable speed motor to create said vacuum in said creating step.

7. The method of cooling articles as recited in claim 1 wherein:

said locating step has a first continuous feed to locate said articles in said cooling chamber and to remove said articles after cooling from said cooling chamber; and said placing step has a second continuous feed to place said dry ice in said vacuum chamber while still maintaining a vacuum.

8. The method of cooling articles as recited in claim 1 wherein said placing step is part of a batch feed system wherein said vacuum chamber is opened to place said dry ice therein and thereafter cool said articles until said dry ice has been substantially sublimated.

9. An apparatus for cooling articles utilizing dry ice comprising:

a vacuum chamber in which said dry ice is located for sublimation;

means for removing gas from said vacuum chamber to produce a vacuum therein and to sublimate said dry ice;

a cooling chamber in which said articles to be cooled are located;

conduit means directing said removed gas and sublimated gas from said vacuum chamber to said cooling chamber;

control means for regulating said removing means to adjust pressure in said vacuum chamber, lowering pressure in said vacuum chamber lowers temperatures of said sublimated gas and hence lowers temperature in said cooling chamber, increasing pressure in said vacuum chamber increases temperature of said sublimated gas and hence increases temperature in said cooling chamber.

10. The apparatus for cooling articles utilizing dry ice as given in claim 9 wherein said control means includes:

measuring device for determining temperature of said sublimated gas; and adjusting device to regulate said removing means to control said temperature and temperature in said cooling chamber.

11. The apparatus for cooling articles utilizing dry ice as given in claim 10 wherein said removing means is a variable speed motor driving at least one propeller to draw a vacuum in said vacuum chamber, speed of said variable speed motor being controlled by said adjusting device.

12. The apparatus for cooling articles utilizing dry ice as given in claim 11 further comprising insulation coupling to prevent low temperatures from said sublimated gas from reaching said variable speed motor.

13. The apparatus for cooling articles utilizing dry ice as given in claim 12 wherein said adjusting device is a variable frequency drive for said variable speed motor.

14. The apparatus for cooling articles utilizing dry ice as given in claim 9 further comprising by-pass means for returning some of said removed gas and said sublimated gas back to said vacuum chamber to create a turbulence around said dry ice to increase sublimation rate of said dry ice.

15. The apparatus for cooling articles utilizing dry ice as given in claim 9 wherein said control means includes vacuum gauge for determining vacuum in said vacuum chamber; and adjusting device to regulate said removed means to control said vacuum which indirectly controls temperature in said cooling chamber.

16. The apparatus for cooling articles utilizing dry ice as given in claim 9, wherein:

said cooling chamber is a continuous feed type to continually insert and remove said articles.

17. The apparatus for cooling articles utilizing dry ice as given in claim 16 wherein said vacuum chamber is a batch feed type that may be continuously operated until substantially all of said dry ice has been sublimated.

18. The apparatus for cooling articles utilizing dry ice as given in claim 17 wherein said vacuum chamber is a continuous feed type with dry ice being continuously fed into said vacuum chamber by a conveyor system as the dry ice sublimates.

* * * * *